(12) United States Patent
Tsai et al.

(10) Patent No.: US 7,058,308 B2
(45) Date of Patent: Jun. 6, 2006

(54) METHOD FOR COMMUNICATING MULTIMEDIA DATA BETWEEN ELECTRONIC DEVICES BY MEANS OF IR RAY

(75) Inventors: Tony Tsai, Taipei Hsieng (TW); Wei Han, Shanghai (CN)

(73) Assignee: Inventec Appliances Corp., Taipei Hsieng (TW)

( * ) Notice: Subject to any disclaimer, the term of this patent is extended or adjusted under 35 U.S.C. 154(b) by 715 days.

(21) Appl. No.: 10/155,036

(22) Filed: May 28, 2002

(65) Prior Publication Data

US 2003/0223755 A1    Dec. 4, 2003

(51) Int. Cl.
*H04B 10/00* (2006.01)
(52) U.S. Cl. .................... 398/128; 398/122; 398/129; 398/131
(58) Field of Classification Search ............. 398/122, 398/127, 128, 129, 131, 125; 342/53, 54, 342/159

See application file for complete search history.

(56) References Cited

U.S. PATENT DOCUMENTS

| | | | | |
|---|---|---|---|---|
| 5,802,467 A | * | 9/1998 | Salazar et al. | 455/420 |
| 6,085,265 A | * | 7/2000 | Kou | 710/63 |
| 6,256,129 B1 | * | 7/2001 | Kim et al. | 398/129 |
| 6,810,216 B1 | * | 10/2004 | Tourunen | 398/202 |
| 2001/0009582 A1 | * | 7/2001 | Kotani et al. | 380/277 |

* cited by examiner

*Primary Examiner*—Kenneth Vanderpuye
*Assistant Examiner*—Dzung Tran
(74) *Attorney, Agent, or Firm*—Bacon & Thomas, PLLC

(57) ABSTRACT

The invention relates to a method for communicating multimedia data between electronic devices by means of IR ray, which comprises the steps of converting data to be transmitted into a document by a document processing program installed in an electronic device for transmission, appending a filename extension thereto for classifying the document, transmitting the document through an IR transceiving control signal by an IR transceiver of the said electronic device, receiving the control signal as an indicative of the transmitted document by another electronic device for receiving, and identifying and processing the received document based on the filename extension thereof so as to create an identifiable data.

8 Claims, 3 Drawing Sheets

METHOD FOR COMMUNICATING MULTIMEDIA DATA BETWEEN ELECTRONIC DEVICES BY MEANS OF IR RAY

FIELD OF THE INVENTION

The present invention relates to data communication and more particularly to an improved method for communicating multimedia data between electronic devices by means of IR ray.

BACKGROUND OF THE INVENTION

In recent years, network has become a very important means for communicating information in this so-called digitized world. Particularly, booming of the Internet and the associated telephone-based network has further facilitated the communication of personal information. Moreover, cellular phones have been popular worldwide due to its portability and inexpensive unit price as a communication device. In addition, latest available PDAs (personal digital assistants) having features of mass storage and powerful data processing are gaining popularity among consumers. As to short distance data communication by cellular phone, typically an infrared (IR) ray is utilized. In one configuration, data of e-card or phone book can be successfully communicated between two cellular phones as long as both cellular phones have the same IR transceiver and implement a common IR protocol.

It is readily understood that multifunctional and highly digitized cellular phones are the trend of today's market. Also, data types available in cellular phone are more diversified and storage space thereof has become even larger. Currently, there are some types of cellular phone capable of supporting multimedia data communication in which IR ray-based multimedia communication is effected.

However, the prior art suffered from several disadvantages. For example, only a few number of data types are available in the frequently used IR ray-based multimedia communication. In a transmission process, first data is converted, decoded, and framed by a certain means. In view of above, the operation is quite inconvenient. Such inconvenience is even worse with respect to IR ray-based multimedia communication. Thus improvement exists in order to overcome the above drawbacks of prior art.

SUMMARY OF THE INVENTION

It is therefore an object of the present invention to in a common IR protocol (e.g., IrDA) provide a method for communicating multimedia data between an electronic device for transmission and an electronic device for receiving by means of IR ray comprising: converting data to be transmitted into a document by a document processing program installed in the electronic device for transmission; appending a filename extension (e.g., .doc) to the document for classifying the document; transmitting the document through an IRCS (IR transceiving control signal) by an IR transceiver of the electronic device for transmission; receiving the IRCS as an indicative of the transmitted document by the electronic device for receiving; and identifying and processing the received document based on the filename extension thereof so as to create an identifiable data. By utilizing this method, it is possible of facilitating the multimedia data communication between the electronic devices. As a result, drawbacks such as data conversion, decoding, and framing by a certain means as experienced by prior art are substantially eliminated.

The above and other objects, features and advantages of the present invention will become apparent from the following detailed description taken with the accompanying drawings.

DETAILED DESCRIPTION OF THE PREFERRED EMBODIMENTS

Figure 1:
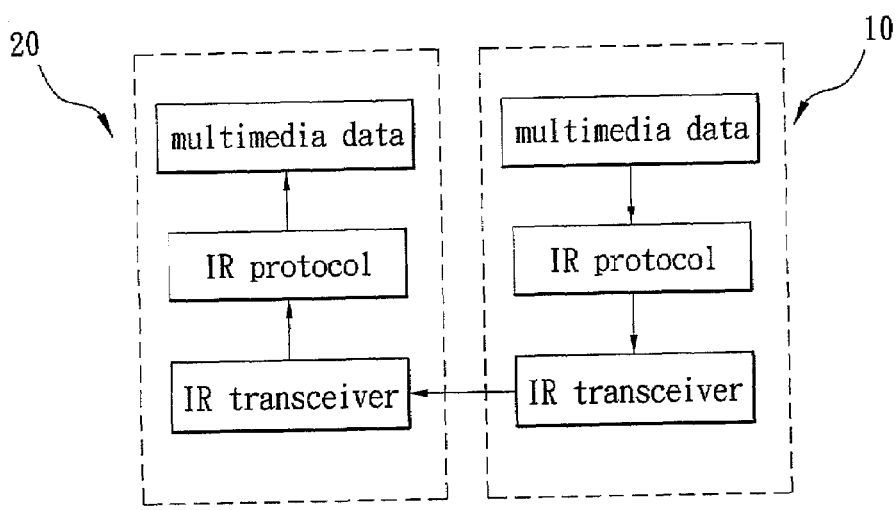
FIG. 1 is a block diagram schematically showing a connection between an electronic device for transmission and an electronic device for receiving for communicating multimedia data therebetween by means of IR ray according to the invention.

Referring to FIG. 1, there is shown a block diagram depicting a connection between an electronic device for transmission 10 and an electronic device for receiving 20 for communicating multimedia data therebetween by means of IR ray according to the invention. In this embodiment, each of electronic device for transmission 10 and electronic device for receiving 20 is a cellular phone. Also, each of electronic device for transmission 10 and electronic device for receiving comprises an IR transceiver. Thus, for example, multimedia data can be transmitted from electronic device for transmission 10 to electronic device for receiving 20 because both of them have the IR transceiver and implement a common IR protocol (e.g., IrDA). The IR protocol comprises an IrLAP (IrDA link access protocol) for data communication established between two electronic devices and an IrLMP (IrDA link management protocol) for multi-path transmission and service established on the IrLAP. Thus, it is possible of providing a single connection with multi-path service and a flow control mechanism, thereby eliminating a dead lock phenomenon between two interconnected electronic devices. The IR protocol further comprises an IrObex protocol for providing a data transmission service similar to that available by HTTP but more powerful. Above protocols are well known. Thus a detailed description thereof is omitted herein for the sake of brevity.

In the embodiment, a structure of multimedia data transmitted from electronic device for transmission 10 to electronic device for receiving 20 by means of IR ray comprises the following fields:

(1) Name of document: It is written in a format of unicode. Unicode comprises most of fonts, symbols, and alphabets available on computer. Unicode can be from one to nine characters in length comprising up to eight characters and a period (.) for separation. Each character consists of two bytes. Hence, the name of document can be up to 18 bytes in length.

(2) Filename extension: It represents a data type of the name of document. For example, it may have the form of (doc). It is also written in unicode and can be from one to three characters (i.e., six bytes) in length.

(3) Maximum length of frame: A frame is employed as a data unit in IR transmission. Also, document is required to frame prior to transmission. Hence, the maximum length of frame defines a maximum length of data permitted to transmit at one time.

(4) Length of document: It defines a length of document to be transmitted.

(5) Content of document: It represents the essential meaning of a document.

Figure 2:
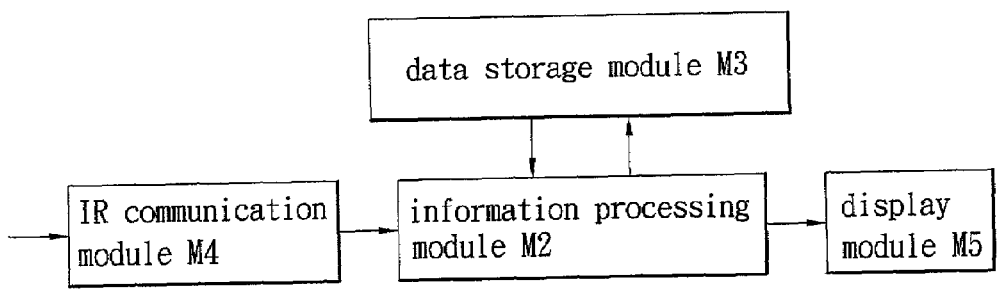
FIG. 2 is a block diagram schematically showing an IR ray-based multimedia communication done by either the electronic device for transmission or the electronic device for receiving.

Referring to FIG. 2, there is shown a block diagram schematically showing an IR ray-based multimedia communication done by either electronic device for transmission 10 or electronic device for receiving 20. As shown, it comprises an information processing module M2 implemented as a CPU (central processing unit), a data storage module M3 consisting of a RAM (random access memory), a ROM (read only memory), and an erasable memory such as flash RAM for receiving an access signal (ACS) for accessing data, an IR communication module M4 consisting of above IR transceiver and IR protocol for receiving an IR transceiving signal (IRS) for transceiving data, and a display module M5 for receiving display signal (DSS), displaying messages, and prompting. In a portable electronic device (e.g., cellular phone) 10 or 20, display module M5 is implemented as an LCD (liquid crystal display).

In the embodiment, a document processing program installed in information processing module M2 of electronic device for transmission 10 first assembles data and filename extension to form a complete document to be transmitted later based on above data structure. Next the document is stored in data storage module M3 of electronic device for transmission 10 which is ready to transmit. In response to a receiving of IR transceiving control signal (IRCS), electronic device for transmission 10 outputs IRS, ACS, and DSS to IR communication module M4, data storage module M3, and display module M5 respectively based on the IRCS, i.e., external transmission. Next, IR communication module M4 of electronic device for receiving 20 receives the IRCS. The received IRCS is in turn stored in data storage module M3 thereof. Information processing module M2 of electronic device for receiving 20 then identifies and processes the received IRCS to create an identifiable data based on the filename extension of the transmitted document.

Figure 3:
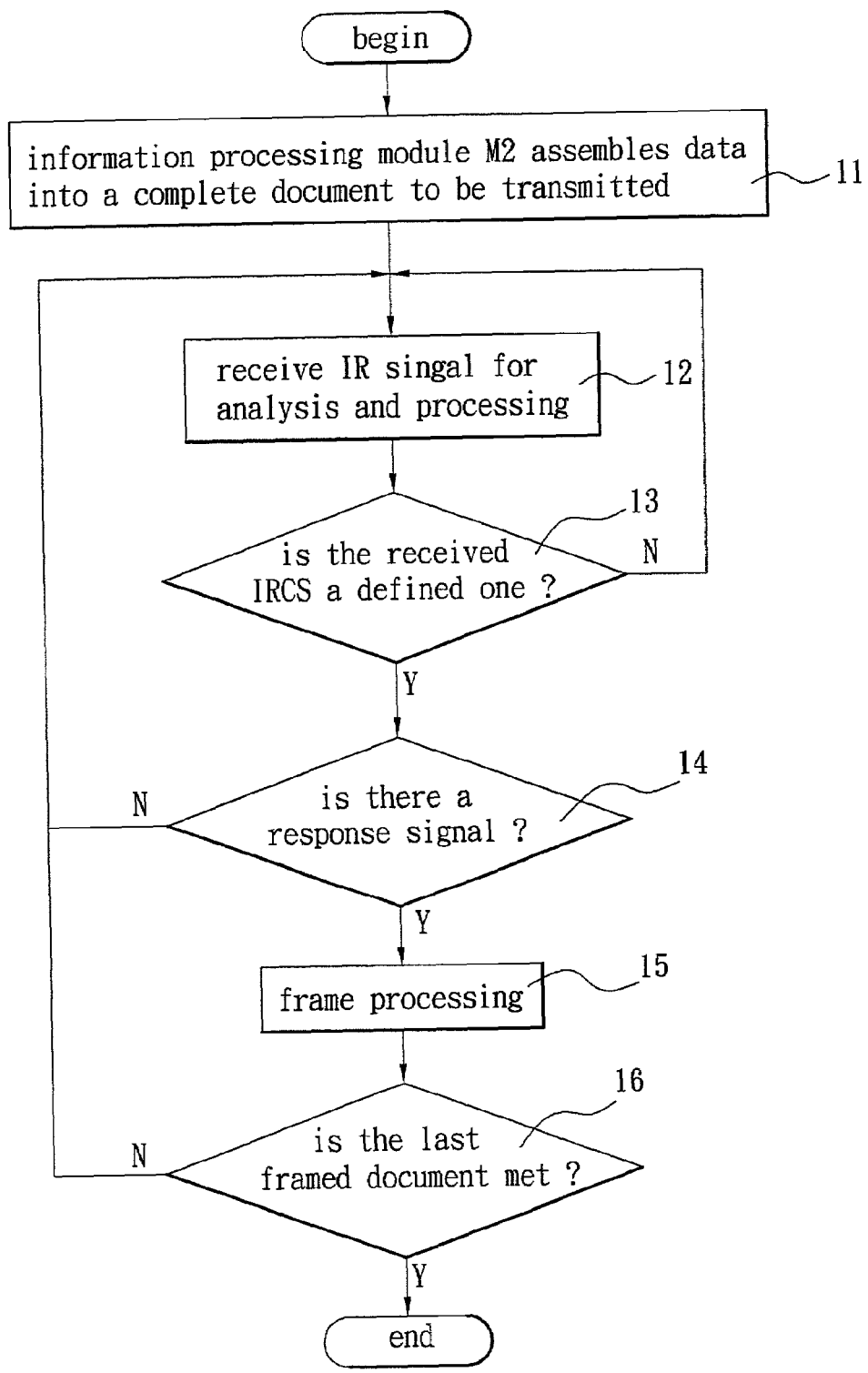
FIG. 3 is a flow chart illustrating the electronic device for transmission how to transmit multimedia data.

Referring to FIG. 3, there is shown a process illustrating electronic device for transmission 10 how to transmit data. The process comprises the following steps:

Step 11: Information processing module M2 first assembles name of document, its filename extension, and data contained therein to form a complete document to be transmitted later based on the data structure. Next the complete document is stored in data storage module M3.

Step 12: Receive an IRCS for analysis and processing.

Step 13: It is determined whether the received IRCS is one that is defined by the system of the invention. If a result of the determination is positive and if electronic device for transmission 10 is in a standby mode, electronic device for transmission 10 outputs IRS, ACS and DSS to IR communication module M4, data storage module M3 and display module M5 respectively based, on the received IRCS, the process then goes to step 14. If a result of the determination is negative and if electronic device for transmission 10 is not in a standby mode, the process loops back to step 12.

Step 14: It is determined by the system whether there is a response signal. If a result of the determination is positive, the process goes to step 15. If a result of the determination is negative, the process loops back to step 12.

Step 15: A frame processing is performed prior to transmission. Messages are shown on display module M5 during the transmission so that user can interrupt the transmission if such is desired.

Step 16: It is determined whether a last framed document is met during the transmission of framed document. If a result of the determination is negative, the process loops back to step 12. If a result of the determination is positive, deactivate the transceiver and release memory occupied by the document. This completes the transmission.

Figure 4:
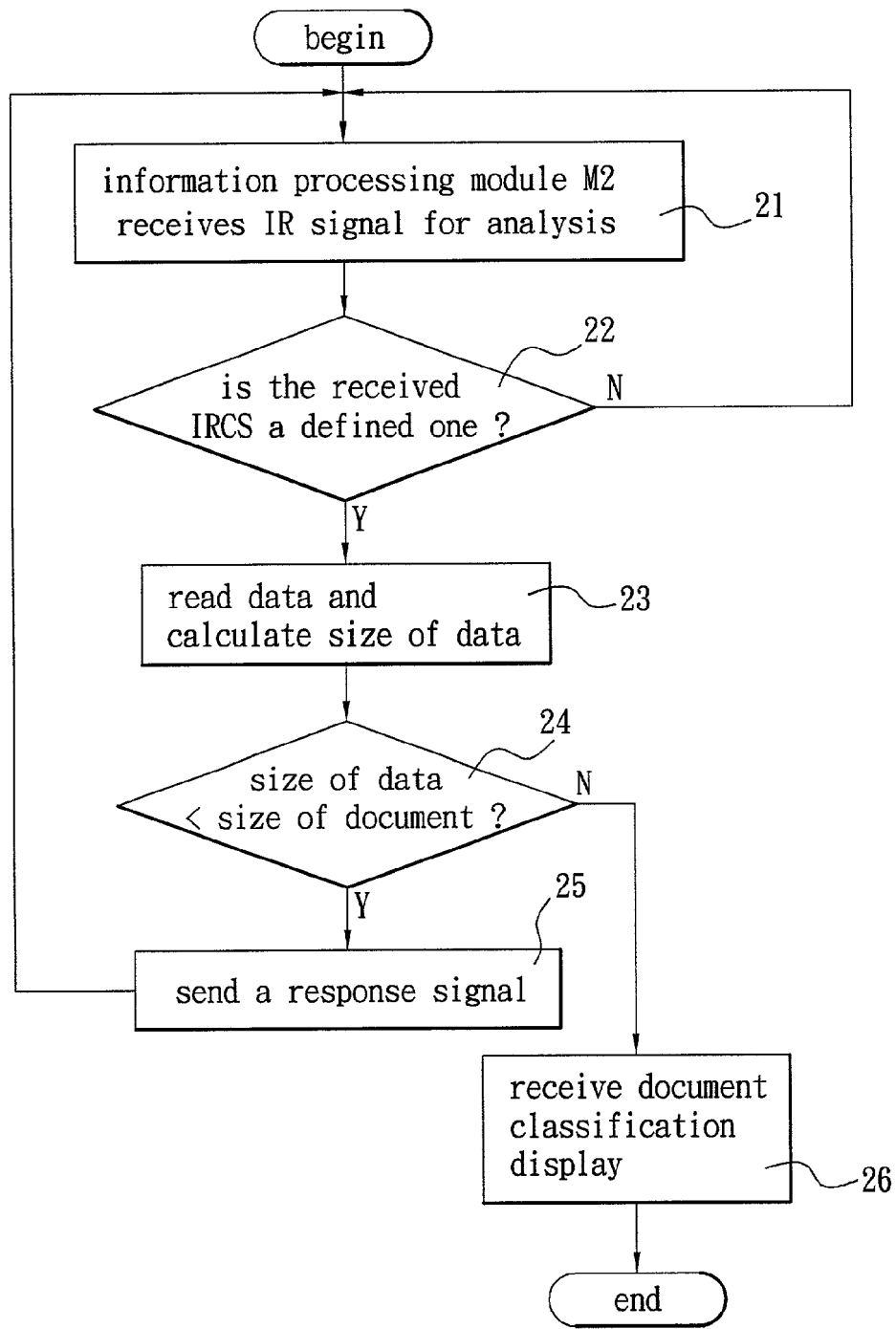
FIG. 4 is a flow chart illustrating the electronic device for receiving how to receive multimedia data.

Referring to FIG. 4, there is shown a process illustrating electronic device for receiving 20 how to receiving data. The process comprises the following steps:

Step 21: Information processing module M2 receives an IRCS for analysis and processing.

Step 22: It is determined whether the received IRCS is one that is defined by the system of the invention. If a result of the determination is positive and if electronic device for receiving 20 is in a standby mode, the process goes to step 23. If a result of the determination is negative and if electronic device for receiving 20 is not in a standby mode, the process loops back to step 21.

Step 23: The electronic device for receiving 10 reads data and calculates the size of data based on the received IRCS.

Step 24: It is determined whether the size of data is less than that of document. If a result of the determination is positive, the process then goes to step 25. If a result of the determination is negative, the process goes to step 26.

Step 25: It means that received data is not complete, a response signal is transmitted prior to looping back to step 21.

Step 26: Receive the transmitted document and store the same in data storage module M3. Identification and classification are performed on the document based on filename extension thereof so as to create an identifiable data. Hence, the result is shown on display module M5 and deactivate the transceiver. This completes the receiving.

In brief, the characteristics of the method of the invention for communicating multimedia data is that an appropriate filename extension is appended to a document to be transmitted so as to classify the document for ease of identifying. This facilitates a multimedia data communication between two electronic devices. As a result, drawbacks such as data conversion, decoding, and framing by a certain means as experienced by prior art are substantially eliminated.

While the invention has been described by means of specific embodiments, numerous modifications and variations could be made thereto by those skilled in the art without departing from the scope and spirit of the invention set forth in the claims.

What is claimed is:

1. A method for communicating multimedia data between an electronic device for transmission and an electronic device for receiving by means of IR (infrared) rays, comprising:

converting data to be transmitted into a document by a document processing program installed in the electronic device for transmission;

appending a filename extension to the document for classifying the document;

transmitting the document through an IRCS (IR transceiving control signal) by an IR transceiver of the electronic device for transmission;

receiving the IRCS as indicative of the transmitted document by the electronic device for receiving;

identifying and processing the received document based on the filename extension thereof so as to create identifiable data, wherein each of the electronic device for transmission and the electronic device for receiving comprises:

an information processing module implemented as a CPU (central processing unit) and including the document processing program;

a data storage module for receiving an ACS (access signal) for accessing data;

an IR communication module consisting of the IR transceiver and an IR protocol for receiving an IRS (IR transceiving signal) for transceiving data; and a display module for receiving a DSS (display signal), displaying message, and prompting, and wherein the electric device for transmission performs the following steps to transmit data:

(a) commanding the information processing module to assemble a name of the document, a filename extension for the document, and data contained in the document to form a complete document to be transmitted based on a data structure of the document;

(b) storing the complete document in the data storage module;

(c) receiving the IRCS for analysis and processing;

(d) determining whether the received IRCS is one defined by a system;

(e) if a result for the determination in step (d) is positive and if the electronic device for transmission is in a standby mode, the electronic device for transmission outputs the IRS, the ACS and the DSS to the IR communication module, the data storage module, and the display module respectively based on the received LRCS;

(f) determining by the system whether there is a response signal;

(g) if a result of the determination in step (f) is positive, performing a frame processing on the document in the data storage module by the information processing module prior to transmission;

(h) determining whether a last framed document is met during the transmission of the framed document; and (i) if a result of the determination in step (h) is positive, deactivating the IR transceiver for the electronic device for transmission and releasing a memory occupied by the framed document prior to completion.

2. The method of claim 1, further comprising the step of, if the result of the determination in step (d) is negative and if the electronic device for transmission is not in the standby mode, analyzing and processing the received IRCS.

3. The method of claim 1, further comprising the step of, if the result of the determination in step (f) is negative, analyzing and processing the received IRCS.

4. The method of claim 1, further comprising showing messages on the display module during the transmission of the framed document so as to interrupt the same if necessary.

5. The method of claim 1, further comprising the step of, if the result of the determination in step (h) is negative, analyzing and processing the received IRCS.

6. The method of claim 1, wherein the electronic device for receiving performs the following steps to receive data:

(j) commanding the information processing module to receive the IRCS for analysis and processing;

(k) determining whether the received IRCS is one defined by the system;

(l) if a result of the determination in step (k) is positive and if the electronic device for receiving is in the standby mode, the electronic device for receiving reading data and calculating a size of data based on the received IRCS;

(m) determining whether the size of data is less than that of the document; and (n) if a result of the determination in step (m) is negative, receiving the transmitted document and storing the same in the data storage module, performing an identification and a classification on the stored document based on the filename extension thereof so as to create an identifiable data, showing a result of the identification and the classification on the display module, and deactivating the IR transceiver of the electronic device for receiving prior to completion.

7. The method of claim 6, further comprising the step of, if the result of the determination in step (k) is negative and if the electronic device for receiving is not in the standby mode, analyzing and processing the received RCS.

8. The method of claim 6, further comprising the step of, if the result of the determination in step (m) is positive, which is an indication of the read data being incomplete, transmitting the response signal prior to analyzing and processing the received IRCS.

* * * * *